United States Patent
Lin

(10) Patent No.: US 10,436,877 B2
(45) Date of Patent: Oct. 8, 2019

(54) WIRELESS POSITIONING SYSTEM

(71) Applicant: Linctronix Ltd., New Taipei (TW)

(72) Inventor: Yu-Shun Lin, New Taipei (TW)

(73) Assignee: LINCTRONIX LTD., New Taipei (TW)

( * ) Notice: Subject to any disclaimer, the term of this patent is extended or adjusted under 35 U.S.C. 154(b) by 0 days.

(21) Appl. No.: 15/994,890

(22) Filed: May 31, 2018

(65) Prior Publication Data

US 2018/0348335 A1  Dec. 6, 2018

(30) Foreign Application Priority Data

Jun. 6, 2017 (TW) .............................. 106118640 A

(51) Int. Cl.
- *G01S 5/04* (2006.01)
- *H04W 4/02* (2018.01)
- *G01S 5/30* (2006.01)
- *G01S 5/00* (2006.01)

(52) U.S. Cl.
CPC .............. *G01S 5/04* (2013.01); *G01S 5/0036* (2013.01); *G01S 5/30* (2013.01); *H04W 4/027* (2013.01)

(58) Field of Classification Search
CPC . G01S 5/009; G01S 5/04; G01S 5/025; G01S 5/0263; G01S 5/14; G01S 5/03; H04W 4/027

See application file for complete search history.

(56) References Cited

U.S. PATENT DOCUMENTS

| 2010/0256852 | A1 | 10/2010 | Mudalige | |
|---|---|---|---|---|
| 2014/0218517 | A1 | 8/2014 | Kim et al. | |
| 2015/0304814 | A1* | 10/2015 | Pandey | H04W 4/023 455/456.2 |
| 2016/0061957 | A1* | 3/2016 | Li | G01S 19/47 342/357.42 |
| 2018/0257688 | A1* | 9/2018 | Carter | G01R 33/072 |

FOREIGN PATENT DOCUMENTS

| TW | I382197 | 1/2013 |
|---|---|---|
| TW | 201520579 | 6/2015 |

* cited by examiner

*Primary Examiner* — Said M Elnoubi

(57) ABSTRACT

A wireless positioning system for detecting a positioning coordinate of a person comprises a wireless positioning device for sending a wireless broadcast signal comprising a device identity code and a motion vector; a plurality of wireless base stations for receiving the wireless broadcast signal and sending a positioning signal comprising a wireless broadcast signal and an RSSI; and a positioning server for receiving the positioning signal and calculating the positioning coordinates of the wireless positioning device according to the positioning signal. Wherein, when the received positioning signal is insufficient to calculate the positioning coordinates, the positioning coordinates are calculated based on the last positioning coordinate plus the motion vector. Compared with the prior art, the wireless positioning system of the present invention uses the RSSI to cooperate with the motion vector. The wireless positioning range is expanded with more accuracy.

8 Claims, 3 Drawing Sheets

WIRELESS POSITIONING SYSTEM

CROSS-REFERENCE TO RELATED APPLICATIONS

This application claims the priority benefit of Taiwan Application Serial No. 106118640 filed Jun. 6, 2017 the disclosure of which is incorporated herein by reference.

FIELD OF THE INVENTION

The present invention relates to a wireless positioning system, more particularly, to a wireless positioning system combined with wireless signal strength indicator positioning method and sensor fusion algorithm.

DESCRIPTION OF THE PRIOR

Global Position System (GPS) is developed by the US Department of Defense and is a satellite navigation system used all over the world. Global Position System is composed of 24 artificial satellites, and the 24 artificial satellites contain three backup satellites. Global Position System is one of the radio positioning methods. Global Position System uses the C/A code standard for public use to obtain the accuracy of tens of meters. Global Position System is originated in NAVSTAR (NAVigation Satellite Timing And Ranging) based on military use. Because of the evolution of the times and the changes in the international political situation, nowadays Global Position System can be used not only in military but also in other economic and more important uses. For example, someone can use Global Position System to find one's own location.

However, although Global Position System is widely used in human life, there are still many restrictions. For example, Global Position System can be used only at the location with good signal. Global Position System probably cannot be used in the basement, because of the poor signal caused by building shield. Furthermore, although Global Position System accuracy can be limited to tens of meters, using in an intensive positioning is not accurate enough. At last, the use of Global Position System positioning is often accompanied by considerable power consumption. Turning on the Global Position System for a long time is likely to be short of power of mobile equipment.

In recent years, Bluetooth Low Energy (BLE) is widely used in indoor positioning technology. Compare to Global Position System, BLE Bluetooth has the advantage of low power consumption and accurate positioning in a small range. But the using of BLE Bluetooth positioning is limited by some reasons. First, a plurality of access point (AP) must be configured in the space. Next, BLE Bluetooth positioning is likely to cause blind side and signal interference due to obstacle. Pedestrian Dead Reckoning system (PDR) calculates the step length and direction to speculate on pedestrian trajectory by inertial sensors, such as acceleration sensors, gyroscopes, digital compasses, etc. Using Pedestrian Dead Reckoning system does not have to set up any access point in the building. However, Pedestrian Dead Reckoning system only has positioning start point as a reference, but has no correction point. Therefore, circular error is prone to happen in positioning.

SUMMARY OF THE INVENTION

In view of this, the present invention provides a wireless positioning system for detecting a positioning coordinate of a person to be positioned, wherein the wireless positioning system comprises a wireless positioning device configured on the person to be positioned. The wireless positioning device further comprises a motion detecting module and a wireless transmitting module. The motion detecting module is used for detecting a movement of the wireless positioning device and calculating to generate a motion vector according to the movement. The wireless transmitting module is connected to the motion detecting module. Wherein, the wireless transmitting module is used for sending a wireless broadcast signal comprising the motion vector and a device identity code. The wireless positioning system further comprises a plurality of wireless base stations and a positioning server. The wireless base stations distribute in a space. Wherein each of the wireless base stations communicates with the wireless positioning device to receive the wireless broadcast signal, and calculates a wireless signal strength indicator of the received wireless broadcast signal, and then sends a positioning signal comprising the wireless broadcast signal, the wireless signal strength indicator, and a location identity code of the wireless base station. The positioning server communicates with the wireless base stations to receive the positioning signals respectively from the wireless base stations, and generates a first positioning coordinate of the wireless positioning device according to the device identity code, the wireless signal strength indicator, and the location identity code comprised in each positioning signal. Also, the positioning server generates a second positioning coordinate of the wireless positioning device according to the device identity code and the motion vector comprised in each positioning signal. Wherein, when the signal of the first positioning coordinate is insufficient or poor to position, the first positioning coordinate and the second positioning coordinate will be composed to be the positioning coordinate of the wireless positioning device.

In an embodiment, the present invention provides a wireless positioning system for detecting a positioning coordinate of a person to be positioned. The wireless positioning system comprises a wireless positioning device, a plurality of wireless base stations, and a positioning server. Wherein, the function of the wireless positioning device and the wireless base stations is similar to the mentioned embodiment. The positioning server uses the first positioning coordinate to adjust the second positioning coordinate to be the positioning coordinate of the wireless positioning device according to a preset distance or a preset time.

In an embodiment, the present invention provides a wireless positioning system for detecting a positioning coordinate of a person to be positioned. The wireless positioning system comprises a wireless positioning device, a plurality of wireless base stations, and a positioning server. Wherein, the function of the wireless positioning device and the wireless base stations is similar to the mentioned embodiment. When the error value between the first positioning coordinate and the second positioning coordinate is less than a preset value, the positioning coordinate of the wireless positioning device is generated.

In practice, the motion detecting module further comprises a sensing module and an operating unit. The sensing module is used for sensing the movement of the wireless positioning device to generate a motion data. Wherein, the sensing module is a triaxial accelerometer, a triaxial gyroscope, a triaxial magnetometer or a combination thereof. The sensing module also can be an electronic compass or other electronic unit comprising the triaxial accelerometer, the triaxial gyroscope, or the triaxial magnetometer. The operating unit connected to the sensing module is used for receiving the motion data and calculating to generate the motion vector by sensor fusion algorithm. Wherein, the sensor fusion algorithm is an algorithm by the displacement of the triaxial accelerometer, the triaxial gyroscope, the triaxial magnetometer or a combination thereof. The acceleration of the triaxial axis in the space of the wireless positioning device is obtained by the triaxial accelerometer, and the distance is estimated by acceleration according to generalized Newton's law of motion: the acceleration is the second derivative of the distance. The angle in the space of the wireless positioning device is obtained by the triaxial gyroscope. The vector in the space can be obtained, depending on the combination of the distance and the angle. The triaxial magnetometer can obtain the height location of the wireless positioning device in space to be used as the estimate of height movement.

Wherein, the positioning server further stores a coordinate location data of the wireless base stations. The coordinate location data of the wireless base stations comprises a coordinate location of the location identity code corresponding to each wireless base station.

The positioning server calculates the positioning coordinate of the wireless positioning device according to the device identity code, the motion vector, and the wireless signal strength indicator comprised in each positioning signal with the coordinate location The positioning method of the first positioning coordinate in mentioned embodiment can be the Proximity Method such as Apple iBeacon or Google Eddystone; otherwise the triangular positioning, multi-point positioning or cellular positioning after calculating the distance by Received Signal Strength Indicator (RSSI).

Compare to prior art, the wireless positioning system of the present invention combines with wireless signal strength indicator positioning method and the motion vector of sensor fusion algorithm. In the prior art, the wireless signal strength indicator positioning method not only occurs determinate errors but also prone to cause blind side and signal interference. On the other side, the motion vector of sensor fusion algorithm is much more accurate in a small range positioning, but the error values is likely to accumulate by time and leads to inaccurate. The wireless positioning system of the present invention combines the advantages of both positioning methods. Therefore, the positioning is much more accurate and the positioning range is expanded.

BRIEF DESCRIPTION OF THE APPENDED DRAWINGS

Some of the embodiments will be described in detail, with reference to the following figures, wherein like designations denote like members, wherein.

The advantages, spirits, and features of the present invention will be explained and discussed with embodiments and figures as follows

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1:
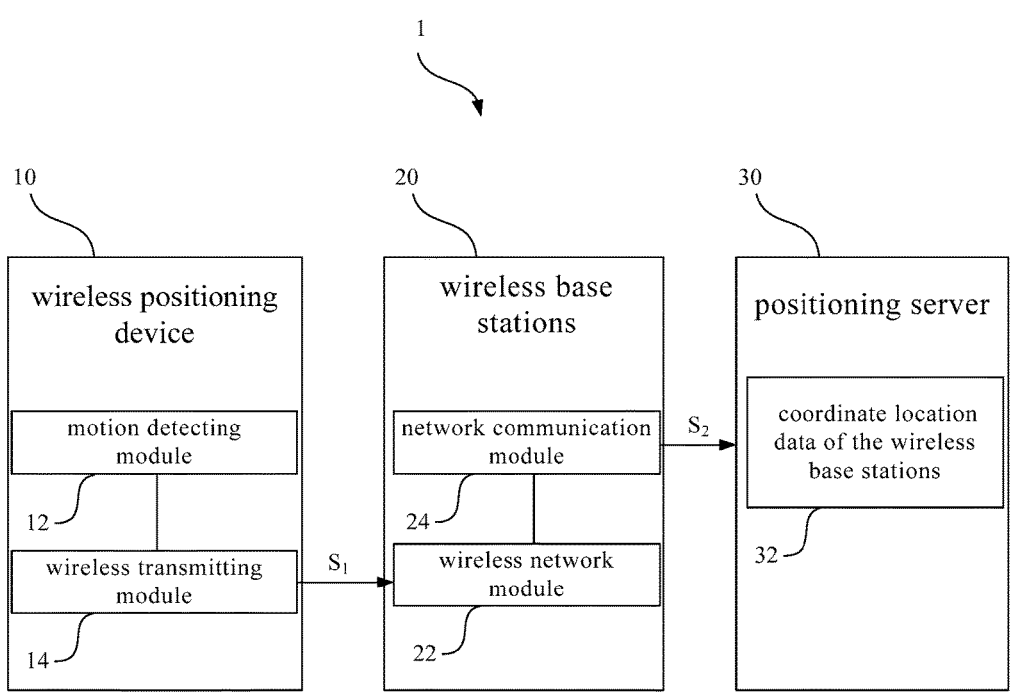
FIG. 1 shows a functional block diagram of the wireless positioning system of the present invention.

Please refer to FIG. 1. FIG. 1 shows a functional block diagram of the wireless positioning system 1 of the present invention. In an embodiment, the present invention provides a wireless positioning system 1 for detecting a positioning coordinate of a person to be positioned. The wireless positioning system 1 comprises a wireless positioning device 10, a plurality of wireless base stations 20, and a positioning server 30. The wireless positioning device 10 is configured on the person to be positioned. The wireless positioning device 10 further comprises a motion detecting module 12 and a wireless transmitting module 14. The motion detecting module 12 is used for detecting a movement of the wireless positioning device 10 and calculating to generate a motion vector according to the movement. The wireless transmitting module 14 is connected to the motion detecting module 12. The wireless transmitting module 14 is used for sending a wireless broadcast signal S1 comprising the motion vector and a device identity code. The plurality of wireless base stations 20 distribute in a space. Each of the wireless base stations 20 screens the wireless broadcast signal respectively to receive the wireless broadcast signal S1 of the wireless positioning device 10, and then calculates a wireless signal strength indicator of the received wireless broadcast signal S1, and sends a positioning signal S2 comprising the wireless broadcast signal S1, the wireless signal strength indicator, and a location identity code of the wireless base station 20. The positioning server 30 communicates with the wireless base stations 20 to receive the positioning signals S2 respectively from the wireless base stations 20. Then the positioning server 30 generates a first positioning coordinate of the wireless positioning device 10 according to the device identity code, the wireless signal strength indicator, and the location identity code comprised in each positioning signal S2. Also, the positioning server 30 generates a second positioning coordinate of the wireless positioning device according to the device identity code and the motion vector comprised in each positioning signal S2. Wherein, when the signal of the first positioning coordinate is insufficient or poor to position, the first positioning coordinate and the second positioning coordinate will be composed to be the positioning coordinate of the wireless positioning device 10. The coordinate of the wireless positioning device 10 is positioned by the first positioning coordinate mainly and by the second positioning coordinate subsidiary. The movement of large distance is suitable in the present embodiment.

In an embodiment, the present invention provides a wireless positioning system 1 for detecting a positioning coordinate of a person to be positioned. The wireless positioning system 1 comprises a wireless positioning device 10, a plurality of wireless base stations 20, and a positioning server 30. Wherein, the function of the wireless positioning device and the wireless base stations is similar to the mentioned embodiment. The positioning server 30 follows a preset condition. When the preset condition is reached, the first positioning coordinate is used to adjust the second positioning coordinate to be the positioning coordinate of the wireless positioning device. The method of calculating the second positioning coordinate by motion vector is to sum up the initiate coordinate and the motion vector. The error value of the motion vector grows exponentially with the time and the moving distance. Therefore, when the movement of the wireless positioning device 10 is over a preset distance or a preset time, the positioning server 30 uses the first positioning coordinate to adjust the second positioning coordinate. The method of adjustment in practice is to make the first positioning coordinate into the initiate coordinate of the second positioning coordinate. Then the motion vector returns to zero and accumulates the motion vector again. Wherein, the preset distance and the preset time can be set by the user. For example, the user can set the first positioning coordinate as an initial point to calculate the second positioning coordinate again every 5 minute, or set the first positioning coordinate as an initial point to calculate the second positioning coordinate again every 100 meters. The coordinate of the wireless positioning device 10 is positioned by the second positioning coordinate mainly and by the first positioning coordinate subsidiary. The movement of small distance and positioning accuracy requirements is suitable in the present embodiment.

In practice, the preset condition can be a time, a distance, or a Received Signal Strength Indicator (RSSI), a sensing value of motion vector, or a combination thereof. The Received Signal Strength Indicator is a wireless signal strength indicator calculated according to the wireless broadcast signal S1 after the wireless base station 20 receives the wireless broadcast signal S1 sent from the wireless positioning device 10. Wherein, if the wireless signal strength indicator is less than a preset value, the second positioning coordinate is adjusted again. The sensing value can be acceleration, direction, angular velocity, or height measured by a triaxial accelerometer, a triaxial gyroscope, and a triaxial magnetometer of the sensing module. Wherein, the second positioning coordinate will adjust again if the sensing value changes abnormally, such as a great displacement in an extremely short period.

In another embodiment, the present invention provides a wireless positioning system 1 for detecting a positioning coordinate of a person to be positioned. The wireless positioning system 1 comprises a wireless positioning device 10, a plurality of wireless base stations 20, and a positioning server 30. Wherein, the function of the wireless positioning device and the wireless base stations is similar to the mentioned embodiment. The positioning server 30 generates the first positioning coordinate and the second positioning coordinate according to the positioning signal S2. The first positioning coordinate is generated by wireless signal strength indicator and is prone to determinate errors. The second positioning coordinate is generated by motion vector and is prone to accumulate the error value. Therefore, the positioning server 30 compares the first positioning coordinate with the second positioning coordinate. When the error value between both is less than a preset value set by the user, the positioning coordinate of the wireless positioning device 10 is generated. For example, when the error value between both is less than 10%, the definitive positioning coordinate will be the mean of the first positioning coordinate and the second positioning coordinate. The first positioning coordinate and the second positioning coordinate are combined to use in this embodiment. The restrictions of generating the positioning coordinate are more, so the positioning coordinate generated is much accurate. However, the number of the generated positioning coordinates may be less.

In practice, the motion detecting module 12 further comprises a sensing module and an operating unit. The sensing module is used for sensing the movement of the wireless positioning device to generate a motion data. Wherein, the sensing module is a triaxial accelerometer, a triaxial gyroscope, a triaxial magnetometer, a combination thereof, or any sensor with the motion sensing function. The sensing module also can be an electronic compass or other electronic unit comprising the triaxial accelerometer, the triaxial gyroscope, or the triaxial magnetometer. The sensing module measures the acceleration of the person to be positioned. The displacement distance can be obtained through the second integral of time. The triaxial gyroscope is used for measuring the moving direction of the person to be positioned. The triaxial magnetometer is used for measuring the change of distance between the ground and the person to be positioned. The measured motion data is transmitted to the operating unit. The operating unit is connected to the sensing module for receiving the motion data. The motion vector is generated by using the sensor fusion algorithm for 3D orientation to fuse the distance and the angle of motion data. However, the measure method and the algorithm are not limited thereto. The motion vector can also be calculated by other methods like Pedestrian Dead Reckoning (PDR).

After the wireless positioning device 10 generates the motion vector by the motion detecting module 12, the wireless broadcast signal S1 including the motion vector is sent to the wireless base station 20 by the wireless transmitting module 14. Wherein, the wireless transmitting module 14 is connected to the motion detecting module 12 through I2C, SPI, UART, or USB.

Please refer to FIG. 1. In an embodiment, the wireless base station 20 comprises a wireless network module 22 and a network communication module 24. Wherein, the wireless network module 22 communicates with the wireless positioning device 10 via the Bluetooth wireless transmission technology, Wi-Fi wireless transmission technology, Zigbee wireless transmission technology, or other wireless transmission. Then, the wireless network module 22 receives the wireless broadcast signal S1 sent from the wireless transmitting module 14. The network communication module 24 can be a Bluetooth module, an Ethernet module, an IEEE 802.15.4, a Wi-Fi wireless network module, a Zigbee wireless network module, a wireless mobile communication module, or any other network module. When the wireless base station 20 receives the wireless broadcast signal S1, the wireless base station 20 sends the positioning signal S2 to the positioning server 30 via the network communication module 24. In the present embodiment, the wireless network module 22 and the mentioned wireless transmitting module 14 can be the transmitting modules communicating to each other, for example, the wireless network module 22 and the wireless transmitting module 14 both are Bluetooth modules. The network communication module 24 and the wireless network module 22 can be the similar or different transmitting modules. For example, the wireless network module 22 and the network communication module 24 both are the Bluetooth modules; or the wireless network module 22 is the Bluetooth module, and the network communication module 24 is the Ethernet module.

Figure 2:
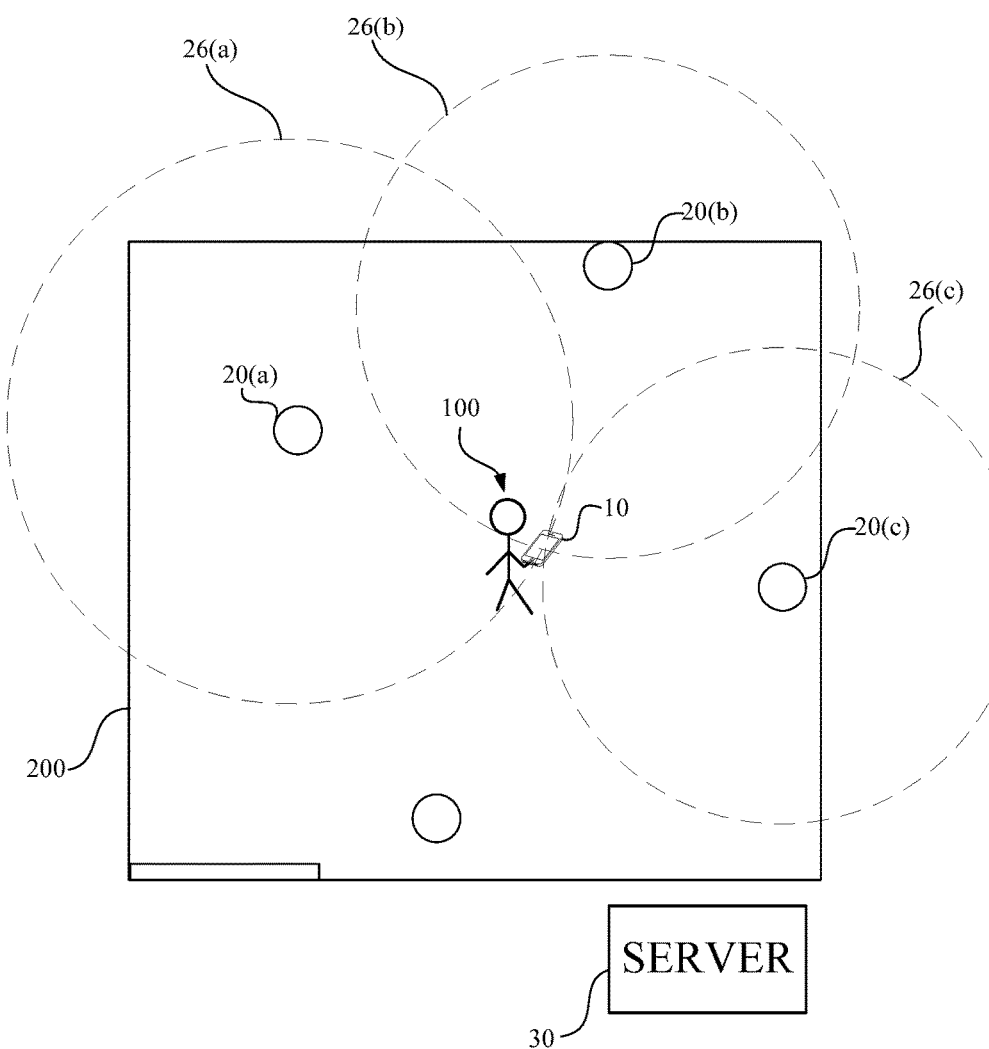
FIG. 2 shows a schematic diagram of wireless signal strength indicator positioning method of the wireless positioning system of the present invention.

Please refer to FIG. 1 and FIG. 2. FIG. 2 shows a schematic diagram of wireless signal strength indicator positioning method of the wireless positioning system 1 of the present invention. In an embodiment, the positioning server 30 further stores a base station coordinate location data 32. The base station coordinate location data 32 comprises a coordinate location corresponding to each location identity code of the wireless base station 20. The positioning server 30 obtains the positioning coordinate of the wireless positioning device 20 sending the positioning signal S2 by comparing the location identity code in the positioning signal S2 and the base station coordinate location data 32. As shown in FIG. 2, a person to be positioned 100 stands in a space 200 with the wireless positioning device 10. The wireless positioning device 10 sends a plurality of the wireless broadcast signal S1 regularly. The wireless broadcast signal S1 is received by the wireless positioning device 20(*a*), 20(*b*), and 20(*c*) respectively. The wireless positioning device 20 generates a corresponding wireless signal strength indicator according to the signal strength indicator of the wireless broadcast signal S1, and then sends the positioning signal S2 to the positioning server 30. Wherein, each positioning signal S2 comprises the wireless broadcast signal S1, the wireless signal strength indicator, and the location identity codes of the wireless base station 20(*a*), 20(*b*), and 20(*c*). Take the wireless base station 20(*a*) as an example; the positioning server 30 receives the positioning signal S2 sent from the wireless base station 20(*a*). The location is obtained according to the location identity codes of the wireless base station 20(*a*). A distance is calculated according to the wireless signal strength indicator in the positioning signal S2. Take the wireless base station 20(*a*) as the center and the wireless signal strength indicator as the radius 26(*a*) to draw a circle. And so on, take the wireless base station 20(*b*) and 20(*c*) as the centers and the wireless signal strength indicator as the radius 26(*b*) and 26(*c*). Wherein, the intersection of the radius 26(*a*), 26(*b*) and 26(*c*) is the coordinate location of the wireless positioning device 10. In practice, in addition to use three wireless base stations to estimate the coordinate location of the wireless positioning device 10, there is another way. For example, the method of using wireless signal strength indicator of two wireless base stations to form a shuttle shape range, or the proximity method such as Apple iBeacon or Google Eddystone. Besides, the cellular positioning algorithm calculating the multi-triangle intersection can be use. The coordinate position of the wireless pointing device 10 is obtained after several convergences by the stochastic process of the mentioned processes and the probability method.

In the mentioned embodiment, the wireless signal strength indicator positioning method works as following: The positioning server 30 uses the positioning algorithm to calculate the signal strength indicators in the wireless broadcast signals S1 sent from the same wireless positioning device 10 received by the wireless base stations 20. Then the relative position between the wireless positioning device 10 and the wireless base stations 20 is estimated. Wherein, the same wireless positioning device 10 can be identify by the device identity code. The device identity code can be a Bluetooth MAC, wireless network MAC, International Mobile Equipment Identity (IMEI), mobile device SIM code, serial number, or the unique identity code for identification recorded in the positioning server 30.

Figure 3:
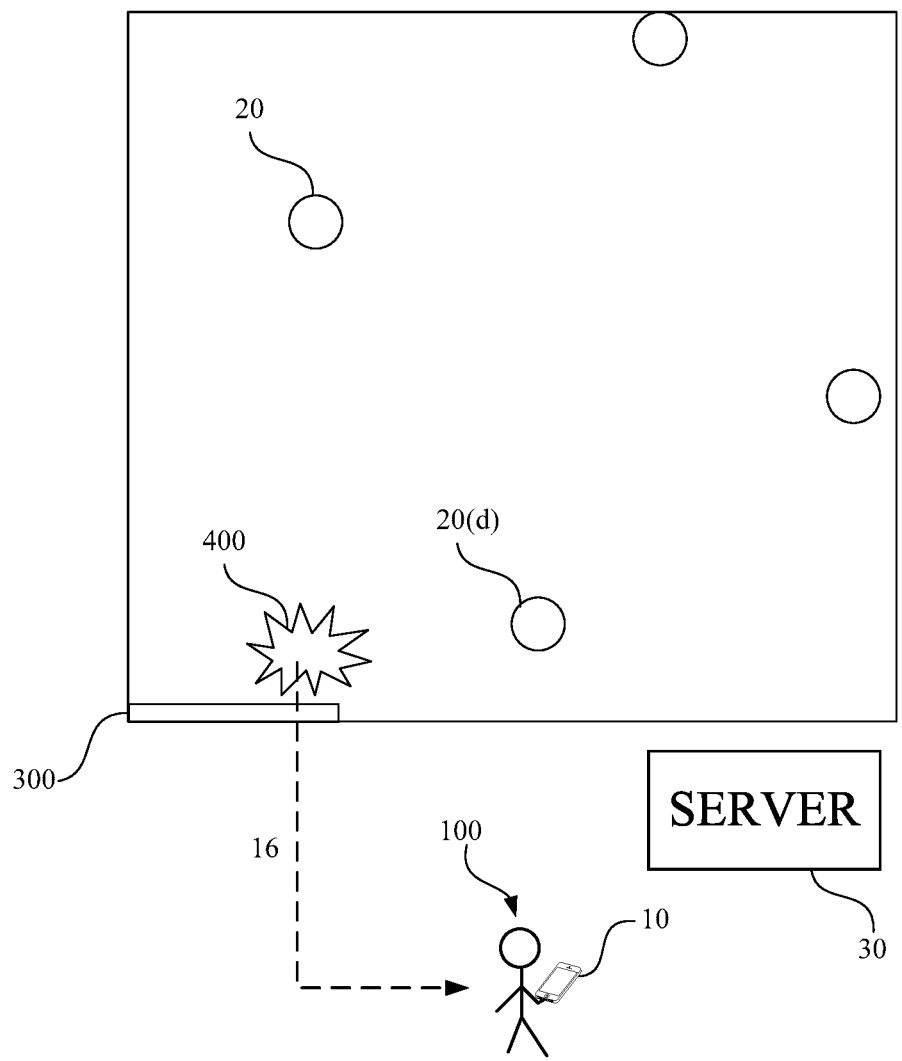
FIG. 3 shows a schematic diagram of the wireless positioning system of the present invention combined wireless signal strength indicator positioning method and sensor fusion algorithm.

Please refer to FIG. 3. FIG. 3 shows a schematic diagram of the wireless positioning system 1 of the present invention combined wireless signal strength indicator positioning method and sensor fusion algorithm. The wireless signal strength indicator positioning method in the mentioned embodiment is limited to the density and location of the wireless base stations 20. The signal strength indicator is prone to insufficient or poor to position. In an embodiment as shown in FIG. 3, the person to be positioned 100 with the wireless positioning device 10 leaves the door 300. The positioning signal S2 is poor to conduct triangle positioning. Wherein, the last positioning location of the triangle positioning is the last positioning point 400. Then the positioning server 30 changes to position the coordinate location of the wireless positioning device 10 by sensor fusion algorithm. The wireless base stations 20(*d*) receives the wireless broadcast signal S1 sent from the wireless positioning device 10, and then sends the positioning signal S2 to the positioning server 30. Since the positioning signal S2 received by positioning server 30 is insufficient to obtain the coordinate location of the wireless positioning device 10 by the wireless signal strength indicator positioning method, the positioning server 30 positions the wireless positioning device 10 by the motion vector in the positioning signal S2 sent from the wireless base stations 20(*d*). For example, the continuously received motion vectors are connected into a motion vector trajectory 16. The motion vector trajectory 16 shows that the person to be positioned 100 moves 40 meters southwardly and then moves 30 meters eastwardly from the last positioning point 400. Therefore, the positioning server 30 positions the wireless positioning device 10 at the location away from the last positioning point 400 50 meters southeast.

The Bluetooth in the mentioned embodiment can be a Bluetooth communication profile for any version defined by Bluetooth Special Interest Group, such as the Bluetooth device with Bluetooth 2.0, Bluetooth 2.1, Bluetooth 3.0, Bluetooth 4.0, Bluetooth 4.1, Bluetooth 4.2, or Bluetooth 5.

The wireless network in the mentioned embodiment can be 802.11 networking standards profile specification for any version defined by Wi-Fi, IEEE, such as IEEE 802.11, 802.11a, 802.11b, 802.11g, 802.11h, 802.11i, 802.11k, 802.11n, 802.11p, 802.11ac, 802.11ad, 802.11ah, 802.11aq, 802.11ax.

Compare to prior art, the wireless positioning system of the present invention combines with wireless signal strength indicator positioning method and the motion vector of sensor fusion algorithm. In the prior art, the wireless signal strength indicator positioning method not only occurs determinate errors but also prone to cause blind side and signal interference. On the other side, the motion vector of sensor fusion algorithm is much more accurate in a small range positioning, but the error values is likely to accumulate by time and leads to inaccurate. The wireless positioning system of the present invention combines the advantages of both positioning methods, and provides three combined manners in response to different situations. Therefore, the positioning is much more accurate and the positioning range is expanded.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless positioning system for detecting a positioning coordinate of a person to be positioned, wherein the wireless positioning system comprises:
   a wireless positioning device, configured on the person to be positioned, comprising:
   a motion detecting module, for detecting a movement of the wireless positioning device, and calculating to generate a motion vector according to the movement; and
   a wireless transmitting module, connected to the motion detecting module, wherein the wireless transmitting module is used for sending a wireless broadcast signal comprising the motion vector and a device identity code;

a plurality of wireless base stations, distributed in a space, wherein each of the wireless base stations communicates with the wireless positioning device to receive the wireless broadcast signal, and calculates a wireless signal strength indicator of the received wireless broadcast signal, and then sends a positioning signal comprising the wireless broadcast signal, the wireless signal strength indicator, and a location identity code of the wireless base station; and a positioning server, communicating with the wireless base stations to receive the positioning signals respectively from the wireless base stations, and generating a first positioning coordinate of the wireless positioning device according to the device identity code, the wireless signal strength indicator, and the location identity code comprised in each positioning signal, and generating a second positioning coordinate of the wireless positioning device according to the device identity code and the motion vector comprised in each positioning signal; wherein, when the signal of the first positioning coordinate is insufficient or poor to position, the first positioning coordinate and the second positioning coordinate will be composed to be the positioning coordinate of the wireless positioning device.

2. A wireless positioning system for detecting a positioning coordinate of a person to be positioned, wherein the wireless positioning system comprises:

a wireless positioning device, configured on the person to be positioned, comprising:

a motion detecting module, for detecting a movement of the wireless positioning device, and calculating to generate a motion vector according to the movement; and a wireless transmitting module, connected to the motion detecting module, wherein the wireless transmitting module is used for sending a wireless broadcast signal comprising the motion vector and a device identity code;

a plurality of wireless base stations, distributed in a space, wherein each of the wireless base stations communicates with the wireless positioning device to receive the wireless broadcast signal, and calculates a wireless signal strength indicator of the received wireless broadcast signal, and then sends a positioning signal comprising the wireless broadcast signal, the wireless signal strength indicator, and a location identity code of the wireless base station; and a positioning server, communicating with the wireless base stations to receive the positioning signals respectively from the wireless base stations, and generating a first positioning coordinate of the wireless positioning device according to the device identity code, the wireless signal strength indicator, and the location identity code comprised in each positioning signal, and generating a second positioning coordinate of the wireless positioning device according to the device identity code and the motion vector comprised in each positioning signal; wherein, the positioning server uses the first positioning coordinate to adjust the second positioning coordinate to be the positioning coordinate of the wireless positioning device according to a preset condition.

3. The wireless positioning system of claim 2, wherein the preset condition is one of a time, a distance, a RSSI (Received Signal Strength Indicator), a sensing value of the motion vector or a combination thereof.

4. A wireless positioning system for detecting a positioning coordinate of a person to be positioned, wherein the wireless positioning system comprises:

a wireless positioning device, configured on the person to be positioned, comprising:

a motion detecting module, for detecting a movement of the wireless positioning device, and calculating to generate a motion vector according to the movement; and a wireless transmitting module, connected to the motion detecting module, wherein the wireless transmitting module is used for sending a wireless broadcast signal comprising the motion vector and a device identity code;

a plurality of wireless base stations, distributed in a space, wherein each of the wireless base stations communicates with the wireless positioning device to receive the wireless broadcast signal, and calculates a wireless signal strength indicator of the received wireless broadcast signal, and then sends a positioning signal comprising the wireless broadcast signal, the wireless signal strength indicator, and a location identity code of the wireless base station; and a positioning server, communicating with the wireless base stations to receive the positioning signals respectively from the wireless base stations, and generating a first positioning coordinate of the wireless positioning device according to the device identity code, the wireless signal strength indicator, and the location identity code comprised in each positioning signal, and generating a second positioning coordinate of the wireless positioning device according to the device identity code and the motion vector comprised in each positioning signal; wherein, when the error value between the first positioning coordinate and the second positioning coordinate is less than 10%, the positioning coordinate of the wireless positioning device is generated according to the mean of the first positioning coordinate and the second positioning coordinate.

5. The wireless positioning system of claim 1, 2, or 4, wherein the motion detecting module further comprises:

a sensing module, for sensing the movement of the wireless positioning device to generate a motion data for calculating to generate a motion vector according to the movement.

6. The wireless positioning system of claim 5, wherein the sensing module is one of the triaxial accelerometer, triaxial gyroscope, triaxial magnetometer or a combination thereof.

7. The wireless positioning system of claim 1, 2, or 4, wherein the positioning server further stores a coordinate location data of the wireless base stations, and the coordinate location data of the wireless base stations comprises a coordinate location of the location identity code corresponding to each wireless base station, and the positioning server calculates the positioning coordinate of the wireless positioning device according to the device identity code, the motion vector, and the wireless signal strength indicator comprised in each positioning signals with the coordinate location.

8. The wireless positioning system of claim 1, 2, or 4, wherein the wireless base stations further comprise a wireless network module and a network communication module, and the wireless network module is used for receiving the wireless broadcast signal sent by the wireless positioning device, and the network communication module sends the positioning signal to the positioning server.

* * * * *